UNITED STATES PATENT OFFICE.

REINHOLD GRÜTER, OF CHARLOTTENBURG, AND HEINRICH POHL, OF BIEBRICH, GERMANY, ASSIGNORS TO CHEMISCHE WERKE VORM. DR. HEINRICH BYK, OF LEHNITZ-NORDBAHN, GERMANY.

MANUFACTURE OF LACTID.

1,095,205.   Specification of Letters Patent.   Patented May 5, 1914.

No Drawing.   Application filed May 15, 1913. Serial No. 767,800.

*To all whom it may concern:*

Be it known that we, REINHOLD GRÜTER and HEINRICH POHL, citizens of the German Empire, residing at Charlottenburg and Biebrich, Germany, respectively, have invented certain new and useful Improvements in the Manufacture of Lactid, of which the following is a specification.

Lactid is produced by heating lactic acid. The procedure according to Wislicenus (*Annalen der Chemie* 167 318/19) consists in first heating lactic acid to about 135° C. and distilling at an external temperature of 150° C. From 10 grams of lactic acid Wislicenus obtained less than 5 grams of a crude lactid which moreover could only be purified by repeated recrystallization. Subsequent research has shown that this crude lactid of Wislicenus is in reality contaminated by a large amount of oily impurities, so that the quantity of actual lactid is only very small, and the ultimate yield of pure lactid shrinks to such an extent, in consequence of the repeated recrystallization required, that the production on a commercial scale is rendered very expensive. This in the case of lactic acid is the point which is of capital importance from the point of view of profitable commercial manufacture.

We have now found that lactid can be produced economically and with an excellent yield if, contrary to the directions of Wislicenus, lactic acid is first heated to a temperature above 135° C., namely to such a temperature and for such a length of time that the lactic acid is converted into a highly molecular substance. This result is best attained by gradually heating the lactic acid to progressively higher temperatures, preferably *in vacuo* and while drawing air through. The raising of the temperature must occur so slowly that when the bath temperature has reached 150° C., the product obtained,—contrary to that in the Wislicenus process, is not distillable at these temperatures. The bath temperature is then preferably further raised for example to 200° C., the dehydration (anhydrization) proceeding still further as the result of the continued heating, and the product becoming still more highly molecular. The mass thus obtained is solid at ordinary temperature and owing to its highly molecular condition it is almost insoluble in water and most organic solvents for example alcohol and ether; it dissolves however, in chloroform.

Contrary to the indications of Wislicenus the surprising fact has been found that in the first place decomposition does not occur in the production of this crude product, even at the high temperature last mentioned. It has further been found that this crude mass, which is but very slightly acid and is probably to be regarded as a polylactyllactic acid, can be converted into lactid by heating to high temperatures. This procedure at the same time represents a depolymerization. If for example this crude mass is heated to 250–300° C., the formation of lactid occurs. If one works under reduced pressure the lactid distils over. It has been found that this process gives yields far exceeding those of Wislicenus, in fact more than double the amount. It has further been found that by adding suitable substances to the crude mass before the splitting the latter can be materially facilitated and accelerated, and with a further increase of the yield. Some substances when added have the further valuable property of substantially reducing the temperature at which the lactid is formed. For example, whereas in carrying out the process without any addition, the heating bath has to be heated to 250° and finally to about 300° C., it is possible to reduce the temperature of formation of the lactid to about 200° C. by adding for instance a little zinc oxid to the crude mass. The amount of added substance only needs to be small. Instead of zinc oxid one can employ aluminium oxid, magnesium oxid and other oxids; one can also employ hydroxids and their salts, with the exception of salts which like those of sulfuric acid have a strongly acid reaction. Thus for instance one can employ carbonates *e. g.* zinc carbonate, and likewise phosphates, *e. g.* alumininum phosphate. Instead of the oxids the metals themselves can be used. The added substances appear to act catalytically and to restrain or reduce the decomposition of the distillation mass by means of their acid-binding property.

All these additions only require to be made in small quantity. In fact those of the added substances which possess a pronounced basic character, even act detrimentally on the process if employed in large quantity.

By the way described not only pure but raw commercial lactic acid can be easily converted into pure lactid, so that the present invention also provides a process of purifying a commercial product into a pure product.

Example: Lactic acid of about 80 per cent. is heated *in vacuo* first to 70° C. and the temperature is then progressively raised to about 200° C., the raising of the temperature being effected at such a rate that substantially only water distils over. The heat is applied until the mass obtained on cooling is quite hard and indicates only very little acid with phenolphthalein. 1 kilo of the highly molecular mass thus prepared is distilled *in vacuo* with 10 grams of calcined zinc oxid, a current of carbon dioxid being preferably led through. At a bath temperature of 200–220° C. 950 grams of lactid distil over and solidify in the collecting or cooling vessel. When pure acid is used the distillate is practically free from oily constitutents. With commercial acid there is sometimes a small amount of oily substance present in the lactid, but this amount is so small that for many purposes the lactid can be used as it is. The oil can easily be extracted by treatment with a solvent, for example a little alcohol, or ether, in which it readily dissolves. The distillate can be recrystallized from the known solvents and then at once shows the right melting point of above 124° C.

The slight quantity of oily substance that may be present is not destroyed material, but anhydrid acid and can be reconverted into the highly molecular product and there worked up to lactid. Even the slight residue can be utilized for which purpose it may either be further distilled at a slight increase of the temperature, or it may be converted into lactic acid or anhydrid acid and returned in this form to the process. It has in fact been found that even the residue, notwithstanding the high temperature employed, consists of almost indecomposed highly molecular lactic anhydrid or its salts. Instead of zinc oxid corresponding quantities of the other added additions mentioned can be employed, but with these, for example with aluminium oxid, the temperature has to be kept about 50° higher. Instead of a current of carbon dioxid one can work with a liquid. For example by adding a hydrocarbon, which distils over, the distillation of the lactid is facilitated. The hydrocarbon then functions as a vehicle. It is likewise possible, using such liquids to do without distillation, the lactid then goes into the hot solvent in proportion as it forms from the raw product, and can be recovered therefrom by crystallization or evaporation. The separation of lactid and raw product in this way is possible, as only the lactid is dissolved by hot hydrocarbons and not the highly molecular raw product. The fact that lactid could be produced practically without loss and with such good yields at the high temperatures mentioned could not be foreseen, especially in view of Wislicenus's statements that the best yields are obtained not exceeding a bath temperature of 150° C.

The new process differs from that of Jungfleisch and Godchot (*Centralblat* 1905, I 862 and 1906, I 1329) in that it contemplates and effects a much more far-reaching anhydrization of the product to be distilled. According to Jungfleisch and Godchot the lactic acid is only heated to temperatures of about 70° or 90°–100° C. The mass thus becomes richer in lactyllactic acid, as is distinctly stated. This product therefore, which consists mainly of lactyllactic acid, is not dehydrated to any great extent, but consists chiefly of anhydrid acid with free carboxyl groups. Therefore in the subsequent distillation a mixture of lactid and much lactyllated lactic acid is obtained.

We claim:

1. Process for the production of lactid, consisting in splitting lactic acid into a highly dehydrated product by heating at temperatures above 135° C., and splitting this product by further raising the temperatures to above 200° C.

2. Process for the production of lactid, consisting in converting commercial raw lactic acid into a highly dehydrated product by heating at temperatures above 135° C., and splitting this product by further raising the temperatures to above 200° C.

3. Process for the production of lactid, consisting in splitting lactic acid into a highly dehydrated product by heating at temperatures above 135° C., and splitting this product by further raising the temperatures to above 200° C., and distilling *in vacuo*.

4. Process for the production of lactid, consisting in converting commercial raw lactic acid into a highly dehydrated product by heating at temperatures above 135° C., and splitting this product by further raising the temperature to above 200° C., and distilling *in vacuo*.

5. Process for the production of lactid, consisting in splitting lactic acid into a highly dehydrated product by heating at temperatures above 135° C., and splitting this product by further raising the temperatures to above 200° C. in presence of a fluid vehicle substantially as described.

6. Process for the production of lactid, consisting in converting commercial raw lactic acid into a highly dehydrated product by heating at temperatures above 135° C., and splitting this product by further raising the temperatures to above 200° C. in presence of a fluid vehicle substantially as described.

7. Process for the production of lactid, consisting in splitting lactic acid into a highly dehydrated product by heating at temperatures above 135° C., and splitting this product by further raising the temperatures to above 200° C., and distilling in vacuo, in presence of a fluid vehicle substantially as described.

8. Process for the production of lactid, consisting in converting commercial raw lactic acid into a highly dehydrated product by heating at temperatures above 135° C., and splitting this product by further raising the temperature to above 200° C., and distilling in vacuo, in presence of a fluid vehicle substantially as described.

9. Process for the production of lactid, consisting in splitting lactic acid into a highly dehydrated product by heating at temperatures above 135° C., and splitting this product by further raising the temperatures to above 200° C., in the presence of small quantities of substances having a catalytic action.

10. Process for the production of lactid, consisting in converting commercial raw lactic acid into a highly dehydrated product by heating at temperatures above 135° C., and splitting this product by further raising the temperatures to above 200° C., in the presence of small quantities of substances having a catalytic action.

11. Process for the production of lactid, consisting in splitting lactic acid into a highly dehydrated product by heating at temperatures above 135° C., and splitting this product by further raising the temperatures to above 200° C., and distilling in vacuo, in the presence of small quantities of substances having a catalytic action.

12. Process for the production of lactid, consisting in converting commercial raw lactic acid into a highly dehydrated product by heating at temperatures above 135° C., and splitting this product by further raising the temperatures to above 200° C., and distilling in vacuo, in the presence of small quantities of substances having a catalytic action.

13. Process for the production of lactid, consisting in splitting lactic acid into a highly dehydrated product by heating at temperatures above 135° C., and splitting this product by further raising the temperatures to above 200° C., in presence of a fluid vehicle substantially as described and in the presence of small quantities of substances having a catalytic action.

14. Process for the production of lactid, consisting in converting commercial raw lactic acid into a highly dehydrated product by heating at temperatures above 135° C., and splitting this product by further raising the temperatures to above 200° C., in presence of a fluid vehicle substantially as described and in the presence of small quantities of substances having a catalytic action.

15. Process for the production of lactid, consisting in splitting lactic acid into a highly dehydrated product by heating at temperatures above 135° C., and splitting this product by further raising the temperatures to above 200° C., and distilling in vacuo, in presence of a fluid vehicle substantially as described and in the presence of small quantities of substances having a catalytic action.

16. Process for the production of lactid, consisting in converting commercial raw lactic acid into a highly dehydrated product by heating at temperatures above 135° C., and splitting this product by further raising the temperatures to above 200° C., and distilling in vacuo, in presence of a fluid vehicle substantially as described and in the presence of small quantities of substances having a catalytic action.

17. Process for the production of lactid, consisting in splitting lactic acid into a highly dehydrated product by heating at temperatures above 135° C., and splitting this product by further raising the temperatures to above 200° C., in the presence of small quantities of substances having an acid-binding action.

18. Process for the production of lactid, consisting in converting commercial raw lactic acid into a highly dehydrated product by heating at temperatures above 135° C., and splitting this product by further raising the temperatures to above 200° C., in the presence of small quantities of substances having an acid-binding action.

19. Process for the production of lactid, consisting in splitting lactic acid into a highly dehydrated product by heating at temperatures above 135° C., and splitting this product by further raising the temperature to above 200° C., and distilling in vacuo, in the presence of small quantities of substances having an acid-binding action.

20. Process for the production of lactid, consisting in converting commercial raw lactic acid into a highly dehydrated product by heating at temperatures above 135° C., and splitting this product by further raising the temperatures to above 200° C., and distilling in vacuo, in the presence of small quantities of substances having an acid-binding action.

21. Process for the production of lactid, consisting in splitting lactic acid into a highly dehydrated product by heating at temperatures above 135° C., and splitting this product by further raising the temperatures to above 200° C., in presence of a fluid vehicle substantially as described and in the presence of small quantities of substances having an acid-binding action.

22. Process for the production of lactid, consisting in converting commercial raw lactic acid into a highly dehydrated product by heating at temperatures above 135° C., and splitting this product by further raising the temperatures to above 200° C., in presence of a fluid vehicle substantially as described and in the presence of small quantities of substances having an acid-binding action.

23. Process for the production of lactid, consisting in splitting lactic acid into a highly dehydrated product by heating at temperatures above 135° C., and splitting this product by further raising the temperatures to above 200° C., and distilling *in vacuo*, in presence of a fluid vehicle substantially described and in the presence of small quantities of substances having an acid-binding action.

24. Process for the production of lactid, consisting in converting commercial raw lactic acid into a highly dehydrated product by heating at temperatures above 135° C., and splitting this product by further raising the temperatures to above 200° C., and distilling *in vacuo*, in presence of a fluid vehicle substantially as described and in the presence of small quantities of substances having an acid-binding action.

In testimony whereof we affix our signatures in presence of two witnesses.

REINHOLD GRÜTER.
HEINRICH POHL.

Witnesses as to R. Grüter:
  HENRY HASPER,
  WOLDEMAR HAUPT.

Witnesses as to H. Pohl:
  MORITZ VEZEL,
  MARIE MENKE.